E. B. HOWELL.
NON-SKID CHAIN.
APPLICATION FILED OCT. 28, 1918.
1,329,838. Patented Feb. 3, 1920.
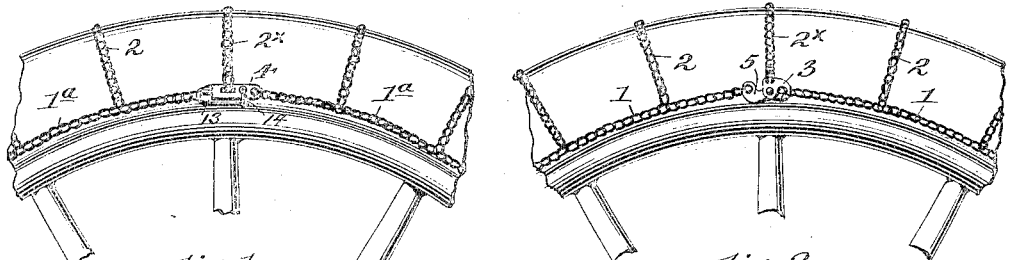
Fig. 1. Fig. 2.
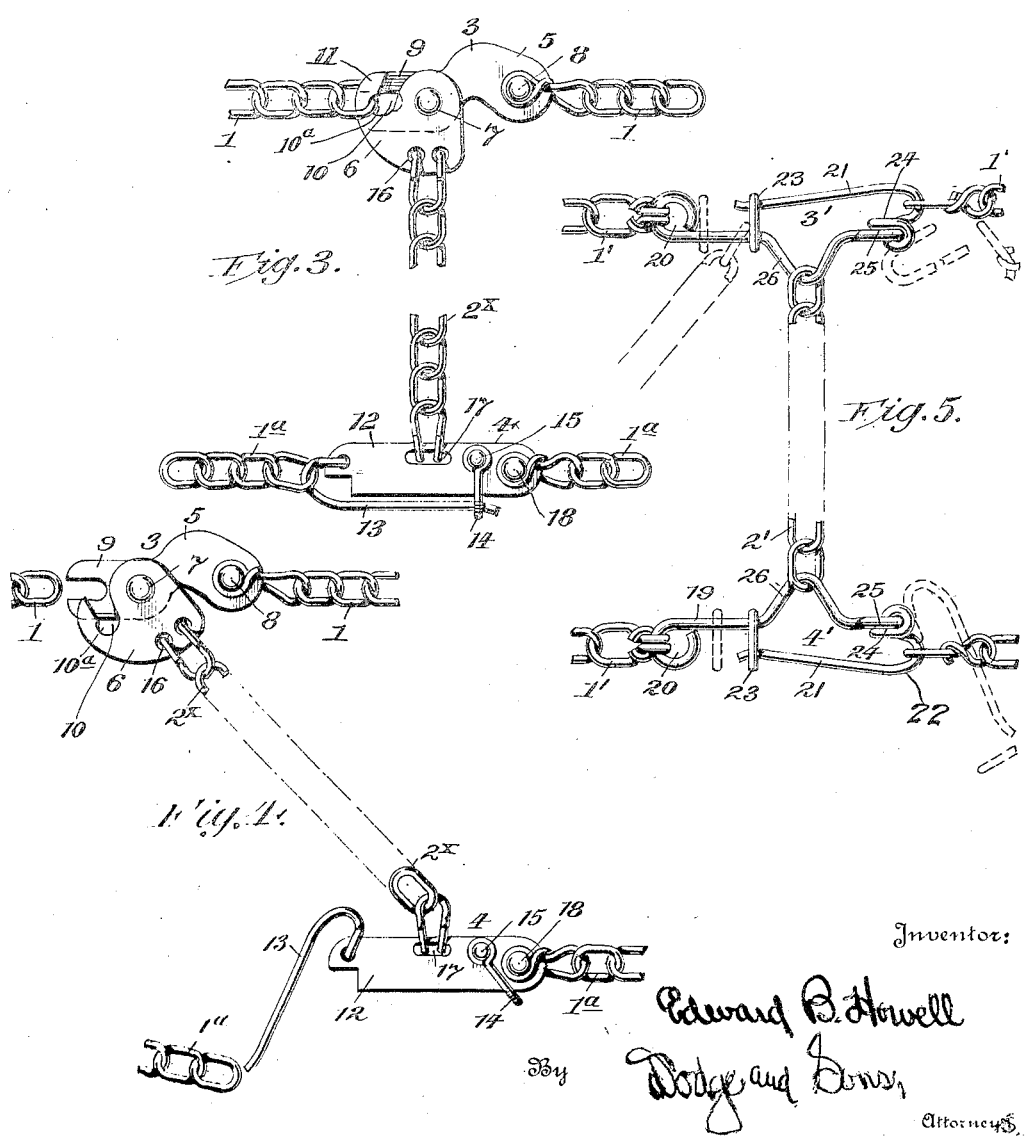
Inventor:
Edward B. Howell
By Dodge and Sons,
Attorneys

UNITED STATES PATENT OFFICE.

EDWARD B. HOWELL, OF BUTTE, MONTANA.

NON-SKID CHAIN.

1,329,838.  Specification of Letters Patent.  Patented Feb. 3, 1920.

Application filed October 28, 1918. Serial No. 259,993.

*To all whom it may concern:*

Be it known that I, EDWARD B. HOWELL, a citizen of the United States, residing at Butte, in the county of Silverbow and State of Montana, have invented certain new and useful Improvements in Non-Skid Chains, of which the following is a specification.

My invention relates to non-skid chains adapted for use on vehicle wheel tires.

The main object of my invention is to simplify and improve the fastening means by which such chains are held in place in relation to tires and released therefrom, whereby a quick release is obtained.

The improved chain embodies longitudinal members and cross members connecting the same, each longitudinal member being secured together at its ends by a coupling. The object in view is to connect said couplings by a cross member, so that when one coupling is operated to release the respective longitudinal member, the last named cross member will be relaxed, thereby either causing the other coupling to release its longitudinal member or permit the same to be easily operated for that purpose by a pull on said last named cross member.

As the description proceeds, it will become apparent that the construction of the coupling members may be modified in a number of ways and yet accomplish the result above stated and therefore I do not wish to be restricted to forms illustrated, in other words the generic claims are to be given a broad scope.

In the accompanying drawings:—

Figure 1 is a fragmentary side elevation of the improved chain, in its applied relation to a tire.

Fig. 2 is a similar view looking toward the opposite side.

Fig. 3 is an enlarged fragmentary plan view of the chain, showing the coupling means in operative position.

Fig. 4 is a similar view, showing the releasing position of the parts.

Fig. 5 is a view similar to Fig. 3, showing another form of coupling means.

The chain is composed, in the main, of longitudinal members 1 and 1ª, and cross member 2, all of said members being ordinarily flexible and composed of links as shown, the cross members 2 connecting the longitudinal members 1 and 1ª at intervals. In order and to apply and remove the chain, the longitudinal members 1 and 1ª are divided at substantially opposite points, as shown in Fig. 3, and the ends thereof are detachably connected by couplings 3 and 4, and the latter are connected by another cross member 2ˣ which is shown as flexible and of the same general character and disposition as the other cross members 2.

As shown in Figs. 3 and 4, the coupling 3 is composed of two members 5 and 6 connected together by a pivot 7, the member 5 being connected by a pivot 8 to the adjacent end of the respective longitudinal member 1, and having a slotted tongue 9 which projects toward the other end of said longitudinal member. The other coupling member 6 has a slot 10 forming a bill or hook 11, the latter being adapted to be inserted through the link or eye at the other end of said longitudinal member 1, as shown in Fig. 3 where the coupling 3 is shown in coupling position.

The other coupling 4, shown in detail in Fig. 3, comprises a link or plate 12 having attached thereto a latch 13, the free end of which is insertible through the adjacent terminal link or eye of the longitudinal member 1ª, as shown in said figure. The coupling 4 also has a shiftable keeper 14, shown as connected to the link 12 by a pivot 15 to permit said keeper to be moved into and out of holding engagement with the latch 13. The couplings 3 and 4 are formed with holes 16 and 17 to enable the cross member 2ˣ to be attached thereto. The other end of the longitudinal member 1ª is attached to the link 12 by fastening means 18.

The length of the cross member 2ˣ is such that when the non-skid chain is on the tire it is under tension and the relation of said cross member 2ˣ to the couplings 3 and 4 in said condition is such that the coupling 3 is sustained in coupling position and prevented from working loose. As soon, however, as the coupling 4 is operated to release its longitudinal member, the cross member 2ˣ is relaxed. This relieves the stress on the coupling 3 and allows it to assume an uncoupling position and to release its longitudinal member, see Fig. 4. This especially commends the non-skid chain for use on soft or muddy road surfaces, as any suitable tool or the like may be used to strike the keeper 14 and cause it to release the latch 13, whereupon the tension on the adjacent longitudinal member 1 will swing the latch to releasing position, as shown in Fig. 4 and permit the cross member 2ˣ to assume the position shown in the same figure, with the result that the coupling 3 will open and release its longitudinal member 1. The non-skid chain will then fall clear of the wheel.

It is found desirable in the actual use of the structure to provide the member 6 with a slight recess 10ᵃ in which the link of the chain may seat itself. This recess is just of sufficient depth so that the coupling will not fall apart from the weight of the cross chain, as it is found that the automatic side would uncouple so readily that it is apt to fall apart or release before the cross chain 2ˣ can be made tight. This recess will hold the automatic side in position until the manually operated side is made fast.

In the form shown in Fig. 5, the couplings 3' and 4' are the counterpart of each other. Each of said couplings comprises a main section 19 having at one end an eye 20 to which one end of the respective longitudinal member 1' is attached. Pivotally attached to the other end of the section 19 is a latch 21 having a bend 22 to engage and hold the terminal link of the other end of said longitudinal member 1'. The free end of the latch 21, when in coupling position, is held by a shiftable keeper 23 in the form of a loop or ring which is slipped over the end of the hasp and is slidable on the main section 19. The latch 21 also has a shoulder 24 which bears against a shoulder 25 on the main section 19 to limit the closing movement of said latch and cause the end portion of said latch to press outwardly against the keeper and retain the latter in its latch holding position, as shown in Fig. 5. The couplings 3' and 4' are connected by a cross member 2' corresponding with the cross member 2ˣ of the preceding figures and having the same function.

To remove the chain shown in Fig. 5 from a tire involves the same operation as that previously described in connection with the first form. The keeper 23 of one coupling is first forcibly disengaged from the respective latch whereupon the tension on the adjacent longitudinal member 1 swings the latch to the open position, indicated by dotted lines in Fig. 5, and releases said longitudinal member. This relaxes the cross member 2' and permits the latter to swing to the dotted line position, during which movement the end link of said cross member slides along the main coupling section 19 of the coupling on the other side and carries the keeper 23 out of engagement with the respective latch. This frees said latch which then swings open and releases the adjacent longitudinal member of the chain. The coupling members 19 are shown as having inwardly offset portions or bends 26 to hold the ends of the cross member 2' in proper relation to the couplings when the chain as a whole is in its applied position. With this form it may be necessary to exert a slight pull on the cross member 2' to release the member 23.

From the foregoing it will be apparent that the main feature of the invention resides in the fact that when one of the couplings is opened, the coupling at the other side is relaxed so that it is free to open or be opened by an angular pull on the connecting cross member, as indicated in Figs. 4 and 5.

What is claimed is:—

1. In combination with a non-skid chain embodying longitudinal members, and cross members connecting the same, a coupling for detachably connecting the ends of one longitudinal member, another coupling for detachably connecting the ends of the other longitudinal member, and a cross member connecting said couplings and adapted upon the release of one coupling to relax the other coupling.

2. In combination with a non-skid chain embodying longitudinal members, and cross members connecting the same, a coupling for detachably connecting the ends of one longitudinal member, another coupling for detachably connecting the ends of the other longitudinal member, and a cross member connecting said couplings and adapted upon the release of one coupling to relax the other coupling, the last named cross member being flexible.

3. In combination with a non-skid chain embodying longitudinal members, and cross members connecting the same, a coupling for detachably connecting the ends of one longitudinal member, another coupling for detachably connecting the ends of the other longitudinal member, and a normally taut cross member connecting said couplings and adapted upon the release of one coupling to relax and permit the other coupling to release the ends of its longitudinal member.

4. In combination with a non-skid chain embodying longitudinal members, and cross members connecting the same, a coupling for detachably connecting the ends of one longitudinal member, another coupling for detachably connecting the ends of the other longitudinal member, and a cross member connecting said couplings and adapted upon the release of one coupling to relax and permit the other coupling to be operated by a pull on said last named coupling for the purpose of uncoupling the ends of the respective longitudinal member.

5. In combination with a non-skid chain embodying longitudinal members, and cross members connecting the same, a coupling for detachably connecting the ends of one longitudinal member, another coupling for detachably connecting the ends of the other longitudinal member, a cross member connecting said couplings and adapted upon the release of one coupling to relax the other coupling, one of said couplings comprising a latch to engage a link of the respective longitudinal member, and a shiftable keeper for said latch.

6. In combination with a non-skid chain embodying longitudinal members, and cross members connecting the same, a coupling for detachably connecting the ends of one longitudinal member, another coupling for detachably connecting the ends of the other longitudinal member, and a cross member connecting said couplings and adapted upon the release of one coupling to relax the other coupling, one of said couplings being held in coupling position by tension on the last named cross member.

7. In combination with a non-skid chain embodying longitudinal members, and cross members connecting the same, a coupling for detachably connecting the ends of one longitudinal member, another coupling for detachably connecting the ends of the other longitudinal member, and a cross member connecting said couplings and adapted upon the release of one coupling to relax the other coupling, one of said couplings being relaxed and permitted to assume an uncoupling position when said last named cross member is relaxed.

In testimony whereof I have signed my name to this specification.

EDWARD B. HOWELL.